3,006,760
PHOTOGRAPHIC MATERIALS
Fritz Dersch and Millet R. De Angelus, Binghamton, N.Y., assignors to General Aniline & Film Corporation, New York, N.Y., a corporation of Delaware
No Drawing. Filed Oct. 23, 1958, Ser. No. 769,090
10 Claims. (Cl. 96—67)

This invention relates to photographic materials. More particularly, this invention relates to photographic materials sensitized by means of water soluble halogenated polyoxyalkylene compounds.

It is well known that polyalkylene oxides such as polyoxyethylenes and polyoxypropylenes increase the speed of silver halide emulsions. It has also been observed that condensation products of alkylene oxides with amines, carboxylic acids, alcohols, amides or phenols (made according to U.S. Patents 1,970,578 and 2,213,477) and dicyclohexylol-dialkyl methane (see U.S. Patent 2,240,472) have been used as sensitizers. The polyalkylene oxides or the alkylene oxide condensation products should have a molecular weight of at least 300 and preferably 1500 to 4000 or more.

The use of the polyalkylene oxides or alkylene oxide condensation products as sensitizers is limited because of their tendency to increase the formation of fog during storage of the photographic film, especially storage at elevated temperatures and humidities. The use of conventional antifoggants is not sufficient to satisfactorily eliminate or minimize fog formation in a film coated with an emulsion containing such products as sensitizers. Special antifoggants had to be found for use with such emulsions and, in this connection, reference is made to U.S. Patents 2,704,716, 2,716,062 and 2,728,666.

It is an object of this invention to provide a novel sensitizer for use with a photographic emulsion to greatly increase the speed of the emulsion without materially increasing the fogging tendency thereof, any tendency to fog being eliminated or minimized by the use of conventional antifoggants.

A further object of this invention is to provide a photographic film having a layer thereon containing a water soluble halogenated polyoxyalkylene derivative in which the halogen replaces the terminal hydroxy group or groups.

Other objects and advantages of this invention will appear to those skilled in the art from the detailed description thereof given below.

We have now discovered that water soluble halogenated polyoxyalkylenes, i.e., halogenated polyalkylene glycols and halogenated condensation products of alkylene oxide with amines, carboxylic acids, amides, phenols or dicyclohexylyl-dialkyl methanes, have a remarkable speed increasing effect on silver halide emulsions. Surprisingly, such halogenated products, unlike the heretofore used unhalogenated polyoxyalkylenes, do not have the objectionable tendency of increasing the fog of photographic films during storage especially under high temperature and humidity conditions. Fogging of photographic film having a coating of a silver halide emulsion and containing the novel sensitizer of our invention may, therefore, be controlled by use of the conventional antifoggants and stabilizers used in the photographic art and the use of a special type of antifoggant to prevent fogging of an emulsion containing unhalogenated polyoxyalkylenes such as those disclosed in U.S. Patents 2,704,716, 2,716,062 and 2,728,666 becomes unnecessary.

The halogenated compounds contemplated for use herein have the following general formulae:

(1) $X-CH_2-CH_2-O-(CH_2-CH_2-O)_m-CH_2-CH_2-X$ (2) $X-CH_2-CH_2-(CH_2)_n-O-(CH_2-CH_2-(CH_2)_n-O)_m-CH-(CH_2)_n-X$ (3) $R-(O-CH_2-CH_2-(CH_2)_n)_m-O-CH_2-CH_2-X$ (4) $R-CO-(O-CH_2-CH_2-(CH_2)_n)_m-O-CH_2-CH_2-X$ (5) $R-N\begin{pmatrix} (CH_2-CH_2-(CH_2)_n)_m-O-CH_2-CH_2-X \\ (CH_2-CH_2-(CH_2)_n)_m-O-CH_2-CH_2-X \end{pmatrix}$ (6) $R-CO-N\begin{pmatrix} (CH_2-CH_2-(CH_2)_n)_m-O-CH_2-CH_2-X \\ (CH_2-CH_2-(CH_2)_n)_m-O-CH_2-CH_2-X \end{pmatrix}$ (7) $\left[ X-CH_2-CH_2-(O-CH_2-CH_2)_m-O-C\underset{CH_2-CH_2}{\overset{CH_2-CH_2}{<}}CH \right]_2 \begin{matrix} alkyl \\ -C- \\ alkyl \end{matrix}$ wherein $n$ is zero to 2; $m$ is such an integer that the molecular weight of the compound is 300 or more; R is alkyl such as octyl, decyl, dodecyl, lauryl, oleyl, octadecyl and the like, an aromatic radical such as butylphenyl, isobutyl-o-cresyl, di-isobutylphenyl, iso-amylcresyl, isohexylxylenyl, iso-octylphenyl, iso-octyl-o-chlorophenyl, iso-octyl-β-naphthyl, isononylresorcyl, isododecylphenyl, dodecylphenyl, octadecylphenyl, o- or p-benzylphenyl and the like or dicylclohexenyl-dialkyl methane; and X is chlorine, bromine or iodine.

Examples of compounds within the ambit of such formulae are:

(1) $Cl-CH_2-CH_2-O-(CH_2-CH_2-O)_{10}-CH_2-CH_2-Cl$ and the corresponding di-bromo- and di-iodo-compounds.

(2) $C_{13}-H_{27}-O-(CH_2-CH_2-O)_{11}-CH_2-CH_2-Cl$ and the corresponding bromo- and iodo-compounds.

(3) $C_{10}-H_{21}-O-(CH_2-CH_2-O)_7-CH_2-CH_2-Cl$ and the corresponding bromo- and iodo-compounds.

(4) $C_{18}-H_{37}-O-(CH_2-CH_2-O)_{17}-CH_2-CH_2-Cl$ and the corresponding bromo- and iodo-compounds.

(5) $C_{17}-H_{35}-CO-O-(CH_2-CH_2-O)_{16}-CH_2-CH_2-Cl$ and the corresponding bromo- and iodo-compounds.

(6) $C_{15}-H_{31}-CO-O-(CH_2-CH_2-O)_{25}-CH_2-CH_2-Cl$ and the corresponding bromo- and iodo-compounds.

(7) $C_8-H_{17}-N\begin{pmatrix} (CH_2-CH_2-O)_{13}-CH_2-CH_2-Cl \\ (CH_2-CH_2-O)_{13}-CH_2-CH_2-Cl \end{pmatrix}$ and the corresponding di-bromo- and di-iodo-compounds.

(8) $C_{18}-H_{37}-N\begin{pmatrix} (CH_2-CH_2-O)_8-CH_2-CH_2-Cl \\ (CH_2-CH_2-O)_8-CH_2-CH_2-Cl \end{pmatrix}$ and the corresponding di-bromo- and di-iodo-compounds.

(9) $C_4-H_9-\underset{}{\bigcirc}-O-(CH_2-CH_2-O)_8-CH_2-CH_2-Cl$ and the corresponding bromo-and iodo-compounds.

(10) The bromo-, chloro- and iodo-compounds of the product of Example 13 of U.S. Patent 2,213,477.

(11) 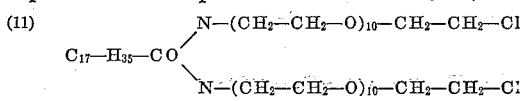

and the corresponding di-bromo- and di-iodo-compounds.

(12) 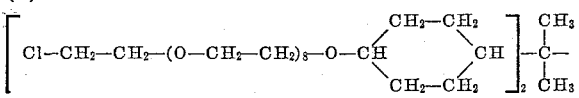

and the corresponding di-bromo- and di-iodo-compounds.

The chloro- and bromo-polyoxyalkylenes may be produced by chlorinating or brominating a polyoxyalkylene compound by the use of thionyl chloride or thionyl bromide respectively, the thionyl compound being added to the reaction mixture dropwise while the mixture is at room temperature. The reaction mixture is then refluxed and the excess of the thionyl compound removed under reduced pressure. Purification of the end product is effected by means of ion exchange columns such as "Amberlite IRA–400" regenerated to its hydroxide form. The salt formed during the reaction is taken by up the ion exchange resin.

The iodide is made from the corresponding bromo- or chloro-compound by refluxing the same in a solvent such as acetone with sodium iodide. The salt formed during the reaction is removed by means of the aforestated ion exchange resin.

The increase of effective sensitivity of photographic silver halide emulsions with halogenated polyoxyalkylenes can be obtained in a number of ways. They may be added to an undercoating, to a middle coating, to an overcoating or to a surface coating prior to the coating operation. If desired, they may be added during the actual preparation of the emulsion either before or after washing of the emulsion.

The speed or sensitivity increasing agents of our invention may be used in various types of photographic emulsions, e.g., non-sensitized emulsions, orthochromatic, panchromatic, and X-ray emulsions. If used with sensitizing dyes, they may be added to the emulsion before or after the dyes are added. Various silver salts may be used as a sensitive element, such as silver bromide, silver iodide, silver chloride or mixed silver halides. The halogenated polyoxyalkylenes may be used in emulsions intended for color photography, e.g., emulsions containing color-forming components. The carrier in the photographic emulsion may be gelatin, or other colloids, such as collodion, albumen, cellulose derivatives, polyvinyl-alcohol or synthetic resins. The emulsion containing our novel sensitizer may be coated on any conventional base, such as paper, glass, cellulose ester such as cellulose acetate, cellulose ethers and others.

The following specific examples are given of the manner of producing and using the sensitizers of our invention. It is to be understood, however, that these examples are given by way of illustration and not by way of limitation.

*Example I*

A silver halide emulsion in gelatin containing 4% silver iodide and 96% silver bromide was prepared in a conventional manner and brought up to its maximum light sensitivity. It was then readied for coating on film base, that is, melted at 40° C., and the necessary coating finals were added such as sensitizing dyes, stabilizers and hardeners. A 10% aqueous solution of chloropolyoxyethylene laurylether containing 12 mols of ethylene oxide was prepared and 10 cc. of this solution were added to a sample of the above described emulsion containing about 0.4 mol of silver halide. A sample of the same emulsion, but not containing the speed increasing additive, served as a control. The so-prepared emulsion samples were coated on a suitable cellulose ester base and dried. Samples of these film coatings were then exposed in a type II–B sensitometer, developed in a developer of the following composition:

| | |
|---|---|
| Metol grams | 1.5 |
| Sodium sulfite, anhydrous do | 45.0 |
| Sodium bisulfite do | 1.0 |
| Hydroquinone do | 3.0 |
| Sodium carbonate, monohydrated do | 6.8 |
| Potassium bromide do | .8 |
| Water to make liter | 1.0 |

The results obtained were as follows:

| | Relative Speed | Fog | |
|---|---|---|---|
| | | After 12' Dev. | 6 Days' Oven Test and 4' Dev. |
| Quantity of Chloropolyoxyethylene laurylether: | | | |
| 0 | 100 | .14 | .08 |
| 1 gram | 160 | .23 | .14 |
| Quantity of Polyoxyethylene laurylether added: | | | |
| 1 gram | 150 | .28 | .19 |

The halogenated sensitizer was prepared as follows: 40 grams of polyoxyethylene laurylether containing 12 mols of ethylene oxide were dissolved in 40 ml. of dry pyridine and placed into a reaction vessel containing a stirrer and reflux condenser. To this mixture at room temperature a dropwise addition of 1.6 grams of thionyl chloride was made. The reaction was now refluxed for two hours. The excess thionyl chloride was removed under reduced pressure and the distillation continued until most of the pyridine was removed. The residue was taken up in 500 ml. of water and passed through an ion exchange column such as "Amberlite IRA–400." Previous to use in the column, the resin was regenerated with 3 liters of a 4% aqueous NaOH solution. The water was evaporated by air drying. A brown tacky solid weighing 35 grams resulted and was found to be very soluble in water and alcohol.

*Example II*

The procedure was the same as in Example I excepting that there was used the halide obtained by chlorination of the addition product of 18 mols of ethylene oxide on stearic acid. The results were similar to those obtained in Example I.

The halogenated addition product was formed as described in Example I while using thionyl chloride.

*Example III*

The procedure was the same as in Example I excepting that there was used the brominated rather than the chlorinated polyoxyethylene laurylether. The results were similar to those of Example I.

The brominated compound was prepared as in Example I excepting that the thionyl chloride was replaced by an equivalent quantity of thionyl bromide.

*Example IV*

The procedure was the same as in Example II excepting that the iodide was used in place of the chloride. The results were similar to those obtained in Example I.

The iodide was prepared by refluxing 1 mol of the chlorinated product of Example II with a molar excess of sodium iodide in acetone for several hours. The acetone was removed by distillation and the salt formed, i.e., sodium chloride, was removed in the ion exchange column.

*Example V*

One kilo of a silver halide emulsion in gelatin containing 4% silver iodide and 96% silver bromide was coated on film base in a manner known to the art.

After the coating was performed, an aqueous gelatin solution containing 20 grams of gelatin per liter and 1.2 grams of the chloropolyoxyethylene laurylether of Example I was coated thereon as an antiabrasion layer. After drying, film samples were exposed and processed as described in Example I. The samples described exhibited a relative speed of 175 with a fog of .16 as compared with a type coating of the same emulsion having an antiabrasion layer similar to that described above, but lacking the speed increasing additive and having a speed of 100 and a fog of .12.

Modifications of the invention will occur to persons skilled in the art. Thus, it is evident that in lieu of the ethylene oxide addition products of the examples, any of the addition products mentioned above or in the noted prior art may be halogenated and employed in our invention. We, therefore, do not intend to be limited in the patent granted except as necessitated by the appended claims.

We claim:

1. A photographic material comprising a light-sensitive silver halide emulsion sensitized with a water soluble polyoxyalkylene compound in which the terminal hydroxy groups have been replaced with halogen, said compound having a molecular weight of at least 300.

2. A light-sensitive silver halide emulsion containing as a sensitizer therefor, a water soluble halogenated polyoxyalkylene compound in which the terminal hydroxy groups have been replaced with halogen, said compound having a molecular weight of at least 300.

3. A light-sensitive silver halide emulsion containing as a sensitizer therefor, a water soluble halogenated polyoxyalkylene compound selected from the group consisting of those having the following general formulae:

(1) $X-CH_2-CH_2-O-(CH_2-CH_2-O)_m-CH_2-CH_2-X$ (2) $X-CH_2-CH_2-(CH_2)_n-O-(CH_2-CH_2-(CH_2)_n-O)_m-CH-(CH_2)_n-X$ (3) $R-(O-CH_2-CH_2-(CH_2)_n)_m-O-CH_2-CH_2-X$ (4) $R-CO-(O-CH_2-CH_2-(CH_2)_n)_m-O-CH_2-CH_2-X$ (5) $R-N\begin{cases}(CH_2-CH_2-(CH_2)_n)_m-O-CH_2-CH_2-X \\ (CH_2-CH_2-(CH_2)_n)_m-O-CH_2-CH_2-X\end{cases}$ (6) $R-CO-N\begin{cases}(CH_2-CH_2-(CH_2)_n)_m-O-CH_2-CH_2-X \\ (CH_2-CH_2-(CH_2)_n)_m-O-CH_2-CH_2-X\end{cases}$ (7) $\left[X-CH_2-CH_2-(O-CH_2-CH_2)_m-O-CH\begin{matrix}CH_2-CH_2\\ \\CH_2-CH_2\end{matrix}CH\right]_2 -\begin{matrix}\text{alkyl}\\|\\C\\|\\\text{alkyl}\end{matrix}-$ wherein R is a radical selected from the group consisting of alkyl, aromatic and heterocyclic radicals; X is a halogen selected from the group consisting of chlorine, bromine and iodine; $n$ is an integer having a value of from 0 to 2 and $m$ is an integer having a value to give the compound a molecular weight of at least 300.

4. A light-sensitive gelatino silver halide emulsion containing chloropolyoxyethylene laurylether having a molecular weight of at least 300 as a sensitizer therefor.

5. A photographic material comprising a base having a layer of gelatino silver halide emulsion thereon, said emulsion being sensitized with a water soluble halogenated polyoxyalkylene compound in which the terminal hydroxy groups have been replaced with halogen, said compound having a molecular weight of at least 300.

6. A photographic material as recited in claim 5 wherein the halogenated polyoxyalkylene is selected from the group consisting of those having the following general formulae:

(1) $X-CH_2-CH_2-O-(CH_2-CH_2-O)_m-CH_2-CH_2-X$ (2) $X-CH_2-CH_2-(CH_2)_n-O-(CH_2-CH_2-(CH_2)_n-O)_m-CH-(CH_2)_n-X$ (3) $R-(O-CH_2-CH_2-(CH_2)_n)_m-O-CH_2-CH_2-X$ (4) $R-CO-(O-CH_2-CH_2-(CH_2)_n)_m-O-CH_2-CH_2-X$ (5) $R-N\begin{cases}(CH_2-CH_2-(CH_2)_n)_m-O-CH_2-CH_2-X \\ (CH_2-CH_2-(CH_2)_n)_m-O-CH_2-CH_2-X\end{cases}$ (6) $R-CO-N\begin{cases}(CH_2-CH_2-(CH_2)_n)_m-O-CH_2-CH_2-X \\ (CH_2-CH_2-(CH_2)_n)_m-O-CH_2-CH_2-X\end{cases}$ (7) $\left[X-CH_2-CH_2-(O-CH_2-CH_2)_m-O-CH\begin{matrix}CH_2-CH_2\\ \\CH_2-CH_2\end{matrix}CH\right]_2 -\begin{matrix}\text{alkyl}\\|\\C\\|\\\text{alkyl}\end{matrix}-$ wherein R is a radical selected from the group consisting of alkyl, aromatic and heterocyclic radicals; X is a halogen selected from the group consisting of chlorine, bromine and iodine; $n$ is an integer having a value from 0 to 2 and $m$ is an integer having a value to give the compound a molecular weight of at least 300.

7. A photographic material comprising a base, a silver halide emulsion sensitizing layer thereon comprising a halogenated polyoxylalkylene compound in which the terminal hydroxy groups have been replaced with halogen, said compound having a molecular weight of at least 300 and a layer of a light-sensitive silver halide emulsion on said first-mentioned layer.

8. A photographic material comprising a base and a layer of a light-sensitive silver halide emulsion on said base, said layer being overcoated with a sensitizing layer for said emulsion comprising a halogenated polyoxyalkylene compound in which the terminal hydroxy groups have been replaced with halogen, said compound having a molecular weight of at least 300.

9. A photographic material comprising a base and a layer of a silver halide emulsion on said base, said layer having uniformly distributed therein a sensitizing agent comprising chloropolyoxyethylene laurylether having a molecular weight of at least 300 and an antifoggant.

10. A photographic material comprising a base having a layer of a silver halide emulsion thereon and a sensitizing layer comprising chloropolyoxyethylene laurylether having a molecular weight of at least 300 in contact with said first-mentioned layer.

References Cited in the file of this patent

UNITED STATES PATENTS

| | | |
|---|---|---|
| 2,423,549 | Blake et al. | July 8, 1947 |
| 2,732,303 | Morgan et al. | Jan. 24, 1956 |
| 2,752,246 | Weaver | June 26, 1956 |
| 2,817,686 | Cicero | Dec. 24, 1957 |
| 2,848,330 | Chechak et al. | Aug. 19, 1958 |